United States Patent
Buchta

[15] 3,656,501
[45] Apr. 18, 1972

[54] VALVE-OPERATOR ASSEMBLY WITH ALIGNMENT AND LOCKING MECHANISM

[72] Inventor: Ervin A. Buchta, Katy, Tex.
[73] Assignee: FMC Corporation, San Jose, Calif.
[22] Filed: May 26, 1970
[21] Appl. No.: 40,657

[52] U.S. Cl................................137/315, 137/454.6
[51] Int. Cl.................................................F16k 31/46
[58] Field of Search..............137/315, 454.2, 454.5, 454.6

[56] References Cited

UNITED STATES PATENTS

| | | | |
|---|---|---|---|
| 2,997,057 | 8/1961 | Toth | 137/315 |
| 3,000,393 | 9/1961 | Maynard | 137/454.2 |
| 3,011,513 | 12/1961 | Heinen | 137/315 X |
| 3,516,639 | 6/1970 | Himmelman | 137/315 X |

Primary Examiner—Alan Cohan
Assistant Examiner—David R. Matthews
Attorney—F. W. Anderson, C. E. Tripp and W. W. Ritt, Jr.

[57] ABSTRACT

A valve and operator assembly with a mechanism for aligning the valve's flow passage coaxially with the flow passage of the housing in which the valve is positioned, and for locking the valve to the housing in the aligned position. The valve has a generally cylindrical body with a portion that is tapered to correspond to a tapered cavity in the housing, and an externally threaded portion for cooperation with an internally threaded drive nut rotatably secured to the housing to properly position and lock the valve in the cavity. The centerline of the valve's tapered portion is offset from the centerline of the threaded portion, and the centerline of the housing cavity is likewise offset from the drive nut's centerline, so that the drive nut can be threaded onto the valve body only when the valve is properly oriented in the housing.

8 Claims, 8 Drawing Figures

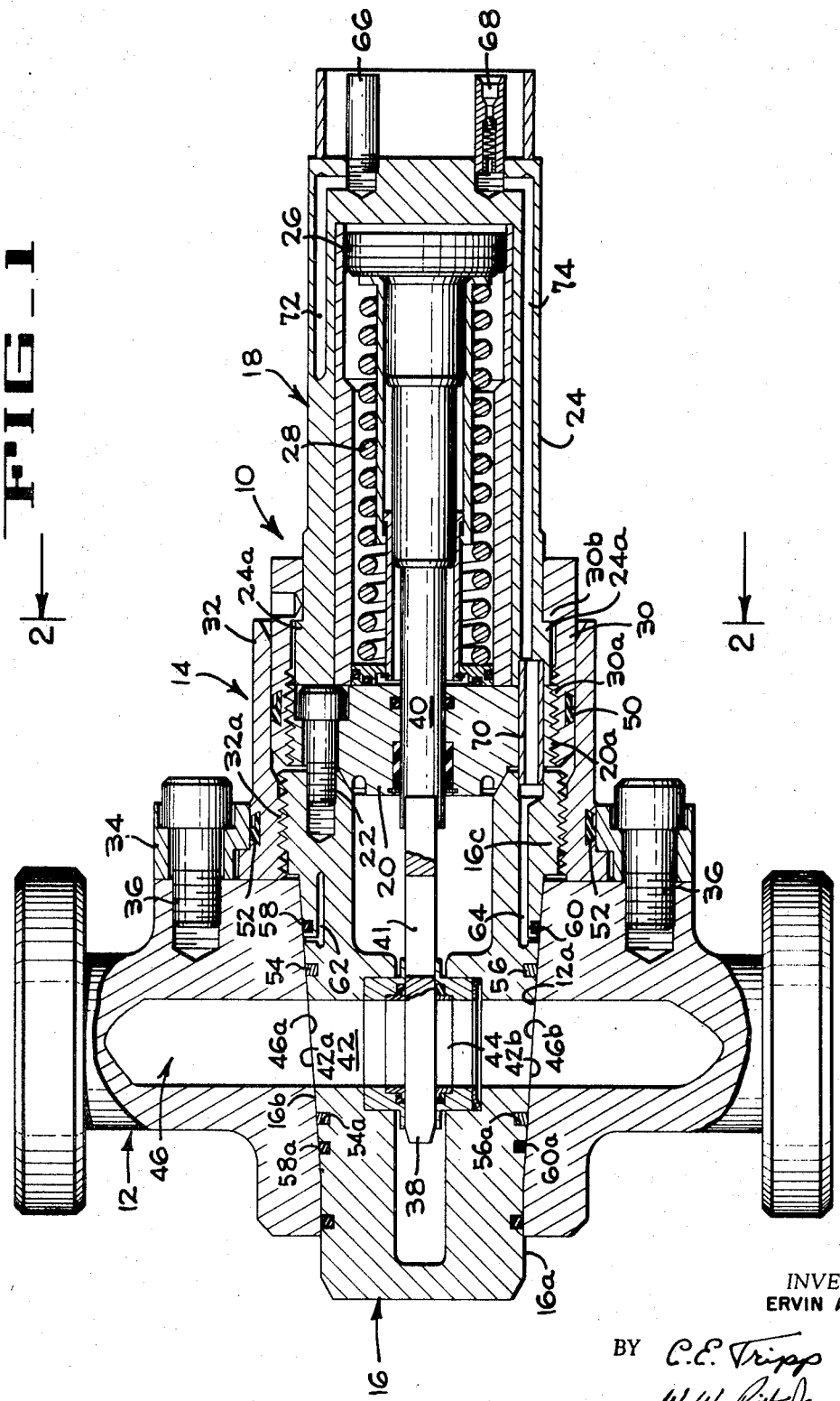

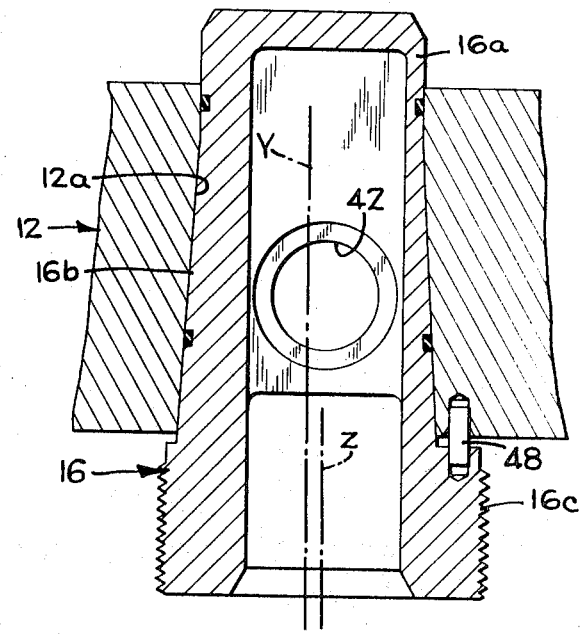
FIG_4
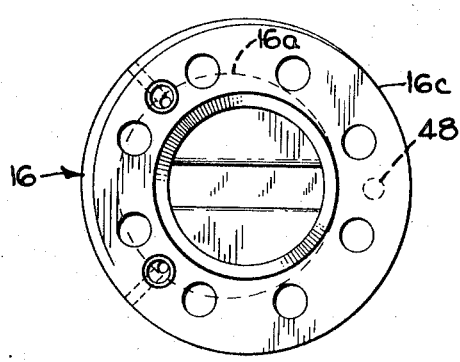
FIG_3
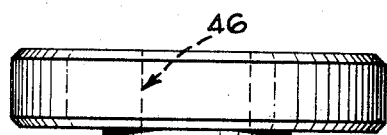
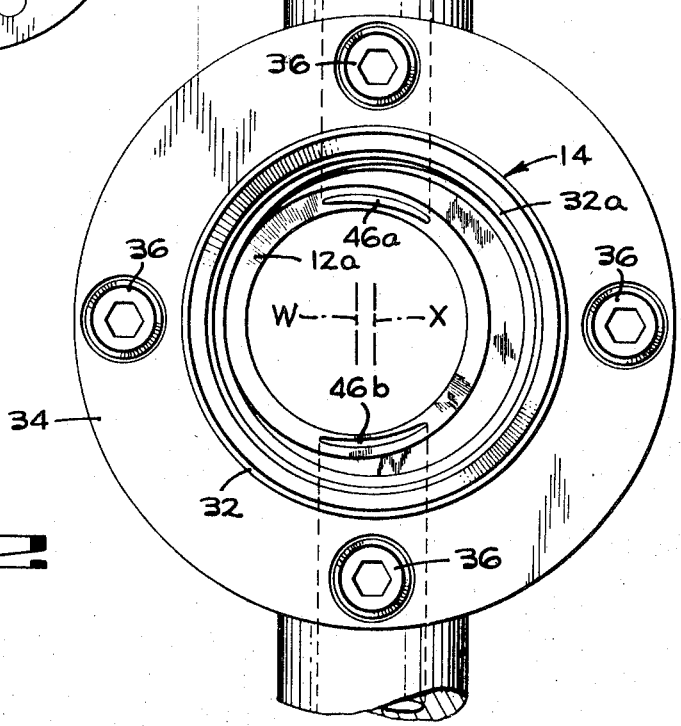
FIG_2

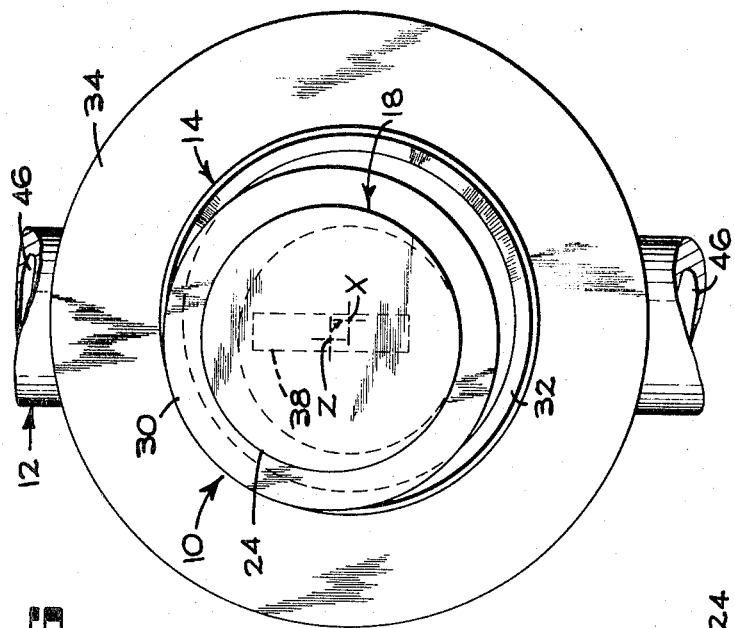
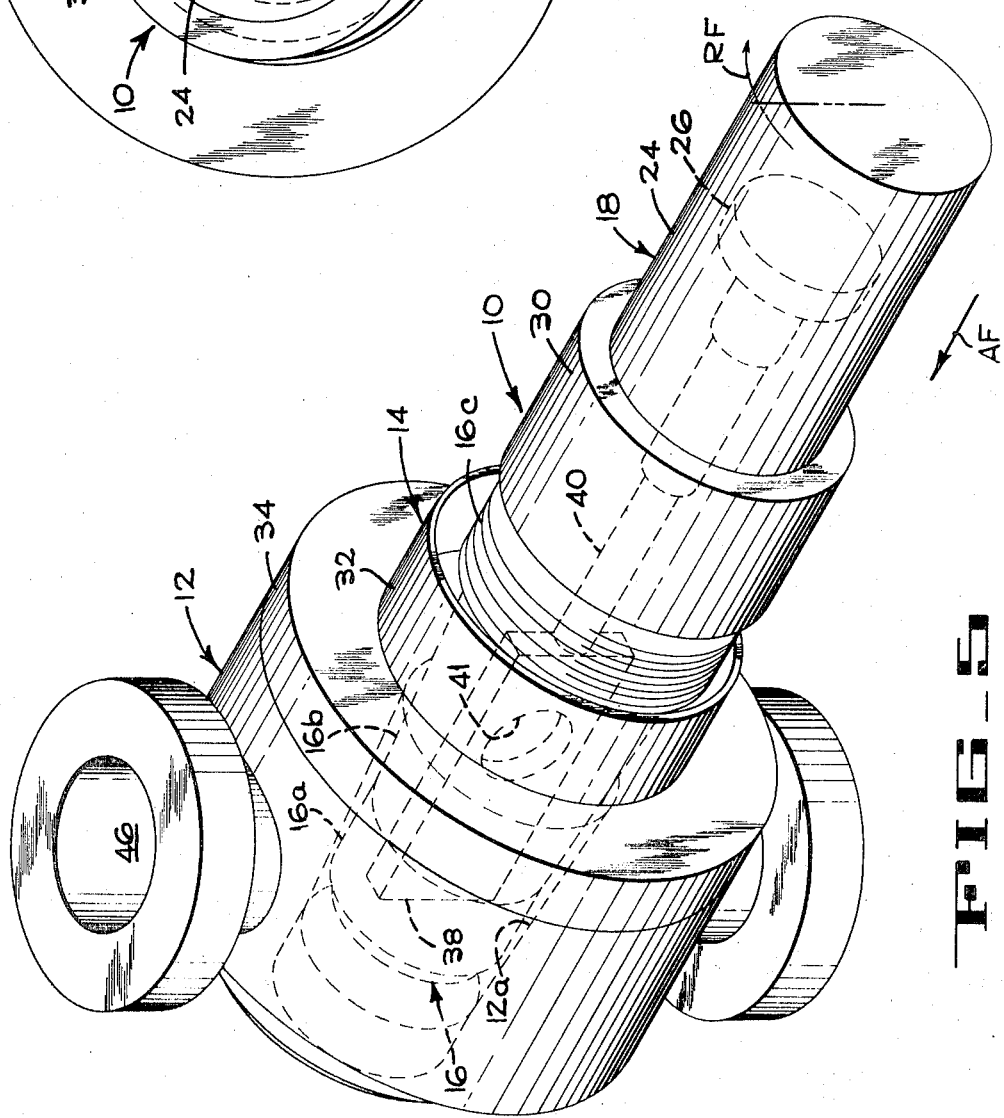

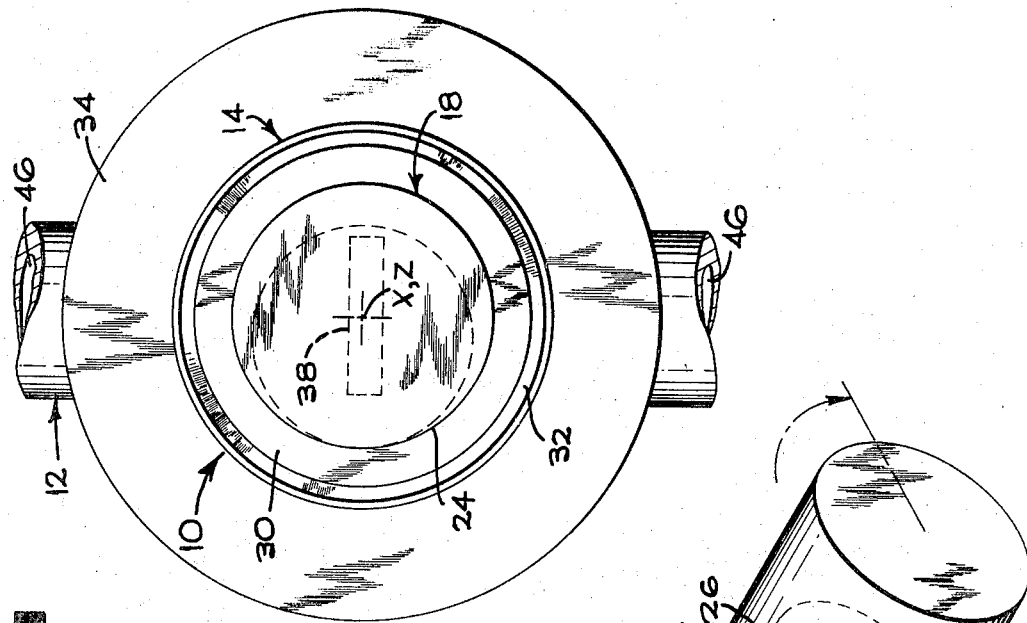
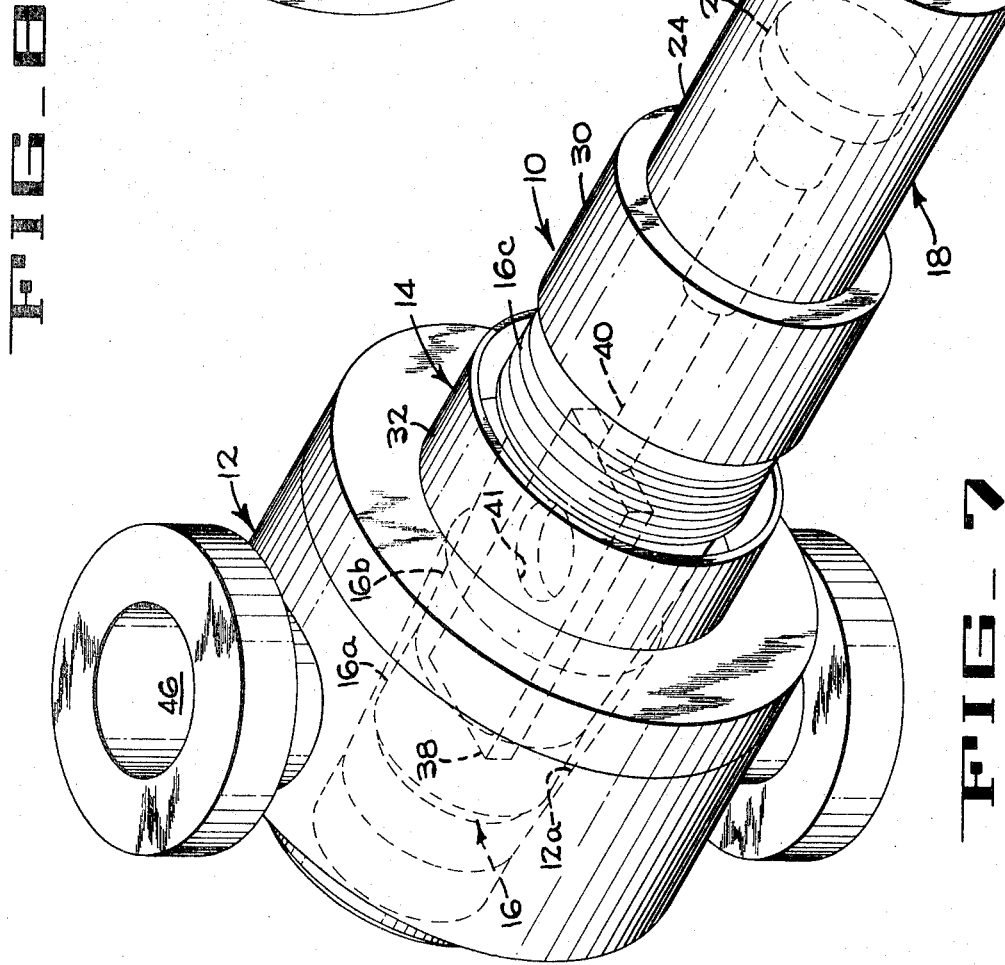

3,656,501

VALVE-OPERATOR ASSEMBLY WITH ALIGNMENT AND LOCKING MECHANISM

BACKGROUND OF THE INVENTION

This invention relates generally to fluid flow controlling valves, and more particularly to valves for use on oil, gas or other fluid well Christmas trees. In one specific sense, the invention relates to gate valves for underwater Christmas trees such as those installed on subsea wells.

The ever increasing demand for petroleum and natural gas has caused the search for these resources to be extended into offshore locations at numerous areas throughout the world. Many large concentrations of hydrocarbons of this type have been found under the continental shelf areas, and current exploratory work is continuing at such locations on a very large scale. For some time it has been common practice to complete wells at offshore locations with a Christmas tree mounted on a surface positioned platform, but such surface completions have the undesirable attributes of high vulnerability to damage from adverse climatic conditions, they present hazards to navigation, and they are esthetically undesirable to certain segments of the community.

To overcome these problems, equipment has been developed and is being used for completing the well underwater, with the Christmas tree positioned on the ocean floor. As is well known, many valves are normally incorporated in an oil or gas well Christmas tree to control the flow of fluids therethrough, and these valves must be repaired or replaced from time to time. In rather shallow water depths, divers are satisfactorily used for this service, but more and more wells are being completed in areas where the water is too deep for efficient diver operation, and servicing valves of these wells can be a considerable problem.

To combat this problem, valves have been developed that can be installed and removed from the tree as a unit, so that when service or replacement becomes necessary their installation and removal can be conducted by remote means. However, one problem with this remote procedure is the provision of a simple, fool-proof mechanism for properly positioning the valve in the tree so that its flow passage and that of the tree are properly aligned. Another related problem involves securely locking the valve in fluid-tight relation to the tree, yet facilitating its easy removal therefrom when service or replacement are necessary. Thus there is a genuine need in this art for a valve that can be easily installed on, and removed from, an underwater Christmas tree, and properly aligned therewith, by a remote control procedure, and it is to the solution of these problems and the provision of such a valve that the present invention is directed.

SUMMARY OF THE INVENTION

Broadly considered, the present invention involves a fluid flow control valve and valve operator assembly, a housing for this valve, and a mechanism for aligning the valve with the housing and securely but removably locking it thereto. The valve body has a tapered cylindrical portion that fits into an equally tapered cavity in the housing, and the alignment and locking mechanism includes a drive nut rotatably secured to the housing and that functions in combination with the valve body to properly align the flow passages of the valve and the housing, and lock the valve-operator assembly securely to the housing. The centerline of the tapered portion of the valve body is offset from the centerline of a threaded portion of the body, and in like manner the centerline of the housing cavity is offset from the centerline of the drive nut, so that the valve must be oriented in the tapered cavity of the housing with the flow passages of the valve and the housing parallel before the drive nut can be threaded onto the valve body, to complete the insertion of the valve into the housing and lock it thereto. The drive nut also functions in combination with the valve body and housing cavity to rotate the valve into proper orientation with the housing so that the threads of the drive nut and the valve body will engage properly. The valve and operator assembly is installed and locked in place in the housing as a unit, and can be replaced with an identical unit without need for removing the housing from the fluid conduit in which it is positioned. The invention also includes a fluid seal system between the valve and the housing, and a provision for testing the integrity of these seals by applying external fluid pressure to them.

Accordingly, one object of this invention is to provide an improved valve-operator assembly and housing therefor.

Another object of this invention is to provide an improved valve-operator assembly and housing for use in an oil, gas or other fluid well Christmas tree.

Yet another object of this invention is to provide a new mechanism for installing a valve in a housing that is especially designed therefor.

Still another object of this invention is to provide a new type of alignment and locking mechanism for employment with a valve body and its housing into which it is insertable.

A further object is to provide an improved combination of valve-operator assembly and housing for use in underwater well Christmas trees, and wherein the valve-operator assembly can be installed in, and removed from, the housing in the tree by remotely controlled means.

BRIEF DESCRIPTION OF THE DRAWINGS

FIG. 1 is a side elevation with parts broken away of a valve-operator assembly installed in a housing according to this invention, the housing comprising a portion of an oil or gas well Christmas tree.

FIG. 2 is an end elevation of the housing of FIG. 1, taken in the direction of the arrows 2—2 of FIG. 1, showing the offset relationship of the centerline W of the valve-receiving cavity in the housing and the centerline X of the drive nut, and illustrating the relative position of the vertical flow passage through the housing with respect to the cavity and drive nut.

FIG. 3 is an end elevation of the rear of the valve body with the valve operator removed, showing the offset relationship of the centerline of the tapered cylindrical portion and the threaded portion of the valve's body, and also showing the passages for testing the fluid seals between the valve body and the housing.

FIG. 4 is a horizontal section of the valve body installed in operating position in the housing, showing the offset relationship of the centerline Y of the tapered portion of the valve body with respect to the centerline Z of the threaded portion of the valve body.

FIG. 5 is a diagrammatic perspective view of the housing with the valve-operator assembly partially inserted therein, showing the assembly 90° out of proper orientation with the housing.

FIG. 6 is a diagrammatic end elevation of the valve-operator assembly and housing as illustrated in FIG. 5.

FIG. 7 is a diagrammatic view similar to FIG. 5, showing the valve-operator assembly after it has been rotated clockwise 90° into its properly oriented position with respect to the housing, and ready for full insertion into the cavity.

FIG. 8 is a diagrammatic view like FIG. 6, showing the valve-operator assembly in properly oriented position with respect to the housing as illustrated in FIG. 7.

DESCRIPTION OF THE PREFERRED EMBODIMENT

With reference to the drawings, and in particular FIGS. 1–4, in one form the present invention comprises a gate valve-operator assembly 10, a housing 12 adapted for receiving and holding the valve-operator assembly 10, and a drive nut assembly 14 for assisting in orienting the valve-operator assembly 10 into proper alignment with the housing 12, and then completing the insertion of the valve into the housing and locking the assembly in aligned, fluid-tight relationship therewith.

The valve-operator assembly 10 comprises a generally cylindrical valve body 16 and an operator 18. The valve body 16 includes a forward cylindrical end portion 16a, an intermediate tapered or conical portion 16b, and a rearward externally threaded portion 16c. An exteriorly threaded valve bonnet 20 is secured to the body portion 16c by means of cap screws 22. The operator 18, which in the illustrated form is hydraulically powered, includes an elongated generally tubular shell 24 providing a housing for a hydraulic piston 26 and a return spring 28, and a locking sleeve 30 with internal threads 30a for engaging the external threads 20a of the valve bonnet 20, and an internal flange 30b for engaging the external flange 24a of the shell 24, to secure the operator 18 to the valve body 16.

The drive nut assembly 14 comprises an orienting guide and drive nut 32 rotatably secured to the housing 12 by a counterbored flange 34. The flange 34 is fastened to the housing by a plurality of spaced cap screws 36.

The valve includes a flow passage closure member in the form of a gate 38 that is connected to a piston rod 40 extending from the piston 26. The gate 38 is provided with a circular port 41 that is adapted to be moved into or out of alignment with the valve's flow passage 42 by admitting and withdrawing hydraulic pressure behind the piston 26, respectively. The valve body is provided with a suitable sealing assembly 44, such as that described in U.S. Pat. No. 3,188,049, to J. P. Zawacki et al., for providing a fluid-tight seal between the gate 38 and the valve body 16.

The housing 12 includes a flow passage 46 that is in coaxial alignment with the valve's flow passage 42 when the valve and housing are locked together in properly aligned, operating condition, as illustrated in FIG. 1. To facilitate this coaxial alignment, and to facilitate installing the valve in the housing 12 while providing for its removal therefrom as a unit with its operator 18, the centerline W (FIG. 2) of the housing's tapered cavity 12a is offset from the centerline X of the drive nut 32, and in corresponding fashion the centerline Y (FIG. 4) of the forward portion 16a and the intermediate tapered portion 16b of the valve's body is laterally offset with respect to the centerline Z of the valve's externally threaded rearward portion 16c.

Thus, in order to fully insert the valve body 16 into the tapered cavity 12a, the valve body must be oriented so that the flow passages 42 and 46 are parallel, with the flow passage portions 42a and 46a on one side of the gate 41, and the flow passage portions 42b, 46b on the gate's opposite side, as shown in FIG. 1. This alignment is achieved by rotating the valve-operator assembly 10 with respect to the housing 12, which can be done either by hand, or by a remotely controllable mechanical manipulator such as is commonly employed to perform mechanical functions by remote control on a subsea wellhead. Once proper orientation of the valve-operator assembly 10 with respect to the housing 12 is established, i.e., when the flow passages 42, 46 are parallel and the portions 42a, 42b abut the portions 46a, 46b, respectively, the threads 32a of the drive nut 32 will be coaxial with the threads of the body portion 16c. By engaging these threads and rotating the drive nut 32, the valve body 16 will then be inserted or driven into the housing 12 until it reaches its proper operating position as illustrated in FIG. 1.

As the valve-operator assembly 10 in unoriented position is inserted into the cavity 12a, the valve body's forward portion 16a will ride against the wall of the cavity and cause the assembly 10 to rotate towards its properly aligned position until the threads 32b are aligned with the threads of the valve portion 16c, as diagrammatically illustrated in FIGS. 5 through 8. The outer portion 32a of the drive nut 32 also offers a guiding surface to the valve body, especially the threaded portion 16c, and thus assists in orienting the valve-operator assembly with the housing cavity. For example, if the valve-operator assembly is 90° out of proper orientation with the housing cavity 12a, such as represented in FIGS. 5 and 6, and an attempt is made to insert the valve into the housing, the valve body's forward portion 16a will contact the surface of the cavity 12a and be diverted towards its properly oriented position in the housing, and the same effect will occur as a result of the valve body contacting the inner surface of the drive nut 32. As an axial force in the direction of the arrow AF (FIG. 5) is exerted on the valve-operator assembly, and at the same time a rotational force is imparted to the assembly in the direction of the arrow RF, the assembly will rotate towards its properly oriented position and at the same time move further inwardly into the housing 12. This rotational and inward movement continues until the valve becomes properly oriented, as illustrated in FIGS. 7 and 8, at which time the threads of the body portion 16c are in position to properly engage the threads 32a of the drive nut 32. At this point the drive nut 32 is rotated to engage the threads of the body portion 16c and drive the body into the housing cavity 12a to its final, aligned operating position as illustrated in FIG. 1. A key 48 (FIG. 4), which fits into opposed holes in the housing 12 and valve body 16, assures positive alignment as the assembly 10 is being drawn up tight into the housing 12 by the drive nut 32.

As described above, during initial insertion of an unoriented valve body 16 into the cavity 12a, the body's forward or nose portion 16a contacts the tapered surface of the cavity 12a and moves along that surface to guide the valve and impart some rotation to it towards proper orientation with respect to the housing 12. In order to avoid scratching or otherwise marring the surface of the cavity 12a, a protective cover of rubber or other soft or resilient material can be provided for the nose section 16a if desired.

The invention also includes a pair of unidirectional annular fluid seals 50, 52 that allow water to escape as the valve operator assembly 10 is being inserted into the housing 12. A pair of primary annular metal seals 54, 56 in grooves 54a, 56a in the valve body portion 16b, circumscribe the flow passages 42, 46 to prevent leakage of well fluids from these passages outwardly between the housing 12 and the body 16. A pair of secondary annular seals 58, 60 in grooves 58a, 60a of the body portion 16b, preferably of rubber or other non-ferrous material and bonded into the grooves, provide a backup seal system for the seals 54, 56.

Two separate fluid testing passages 62, 64 provide a system for testing the flow passage seals 54, 56, and 58, 60, respectively, for leakage. These passages 62, 64, are connected to seal test fluid connectors 66, 68 in the operator shell 24 by tubular sealing sleeves 70 (only one being shown in FIG. 1) that extend from the operator shell through the valve bonnet 20 into the valve body portion 16c, and longitudinal passages 72, 74 in the shell 24 between the sleeve 70 and the connectors 66, 68, respectively. Thus, by applying pressurized fluid to the connectors 66, 68, and observing the presence or absence of such fluid in the flow passages 42, 46 and the outside of the assembly 10, the integrity of the seals 54, 56, 58 and 60 can be determined.

One of the advantages of this invention is that the valve-operator assembly 10 can be installed in proper alignment into, and removed from, the housing 12 as a unit without the need for diver assistance, i.e., the entire operation can be performed by remote control. The only requirement for such remote procedures is a properly functioning remotely controllable manipulator that will provide both axial and rotational movement to the valve-operator assembly.

Another advantage of this invention is that the conduit in which the housing 12 is installed does not have to broken in order to remove or install the assembly 10. This is of critical importance where the valve is used in a wellhead system where breaking the conduit could either be impossible without removal of the Christmas tree to the surface, or would be highly time consuming and complicated.

Still another advantage of this valve operator assembly is the fact that it can be removed as a unit and taken to the surface for inspection and repair by one simple operation, and reinstalled in properly aligned relationship with the housing 12 by a correspondingly simple procedure.

Although the best mode contemplated for carrying out the present invention has been herein shown and described, it will be apparent that modification and variation may be made without departing from what is regarded to be the subject matter of the invention.

What is claimed is:

1. An apparatus for aligning and locking a fluid flow control valve-operator assembly with a housing therefor, said assembly having a valve body with a tapered cylindrical portion and said housing having a tapered cylindrical cavity for receiving said tapered valve body portion in fluid-tight relationship therewith, comprising a) an annular, drive means rotatably secured to said housing in circumscribing relationship to said cavity, with the axis of said drive means parallel to but offset from the axis of said cavity, and b) a cylindrical drivable means secured to said tapered valve body portion, with the axis of said drivable means parallel to but offset from the axis of said tapered body portion, whereby the valve-operator assembly must be oriented with the axis of said tapered body portion coaxial with the axis of said housing cavity, and the axis of said drive means coaxial with the axis of said driven means, before said tapered body portion can be inserted into said housing cavity and a fluid-tight relationship established therebetween.

2. An apparatus according to claim 1 wherein said drive means comprises a drive nut with an internally threaded portion, and said driven means includes an externally threaded portion engageable and threadable with said drive means threaded portion.

3. An apparatus according to claim 2 wherein said drive nut is secured to said housing by means of an annular, flanged retaining ring, and said driven means comprises an integral extension of said valve's tapered body portion.

4. An apparatus according to claim 3, including a first flow passage through said valve and a second flow passage through said housing, said flow passages in coaxial alignment when said valve is in fluid-tight relationship with said housing, and primary and secondary sealing means for establishing a fluid-tight seal between said flow passages.

5. An apparatus according to claim 4, including a fluid passage system for the admission of external pressurized fluid to said primary and secondary sealing means to determine the integrity thereof when the valve-operator assembly is installed in proper alignment with the housing cavity.

6. An apparatus according to claim 3, including one-way seal means between the valve-operator assembly and the drive nut to facilitate egress of fluid from said apparatus as said assembly is being installed and locked to said housing.

7. An apparatus according to claim 1, wherein said valve-operator assembly comprises a gate valve and an hydraulically powered operator therefor.

8. An apparatus according to claim 1, wherein said housing comprises a component of a fluid-well Christmas tree, and said valve-operator assembly is adapted for operation in a submerged environment.

* * * * *